United States Patent Office

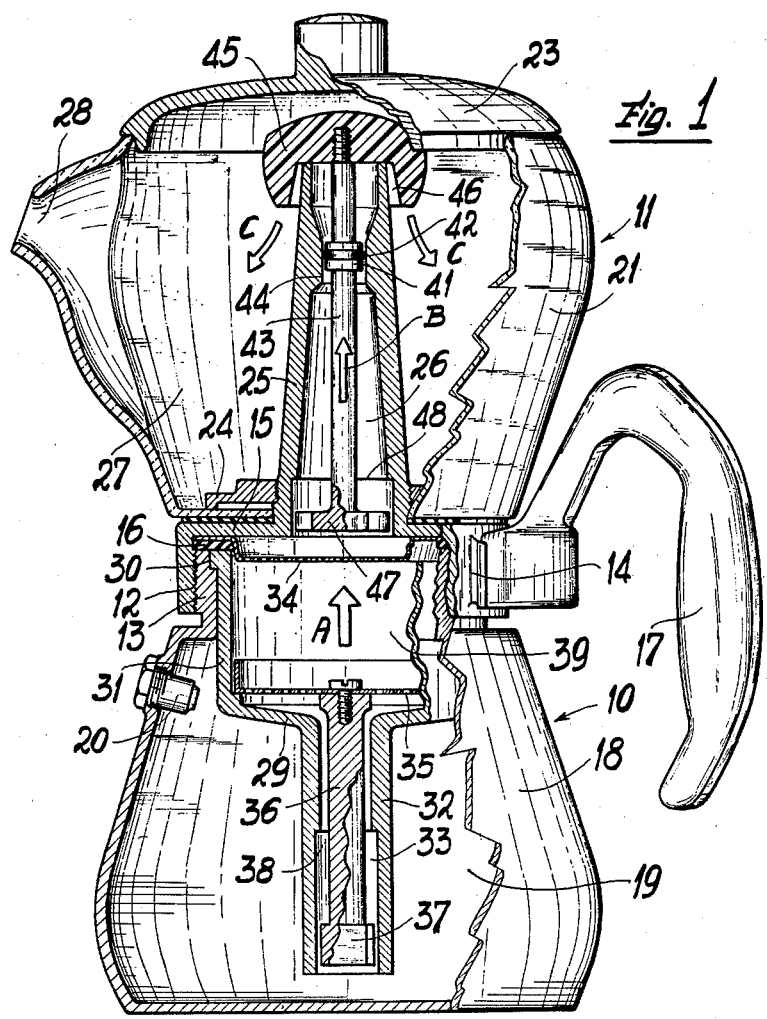

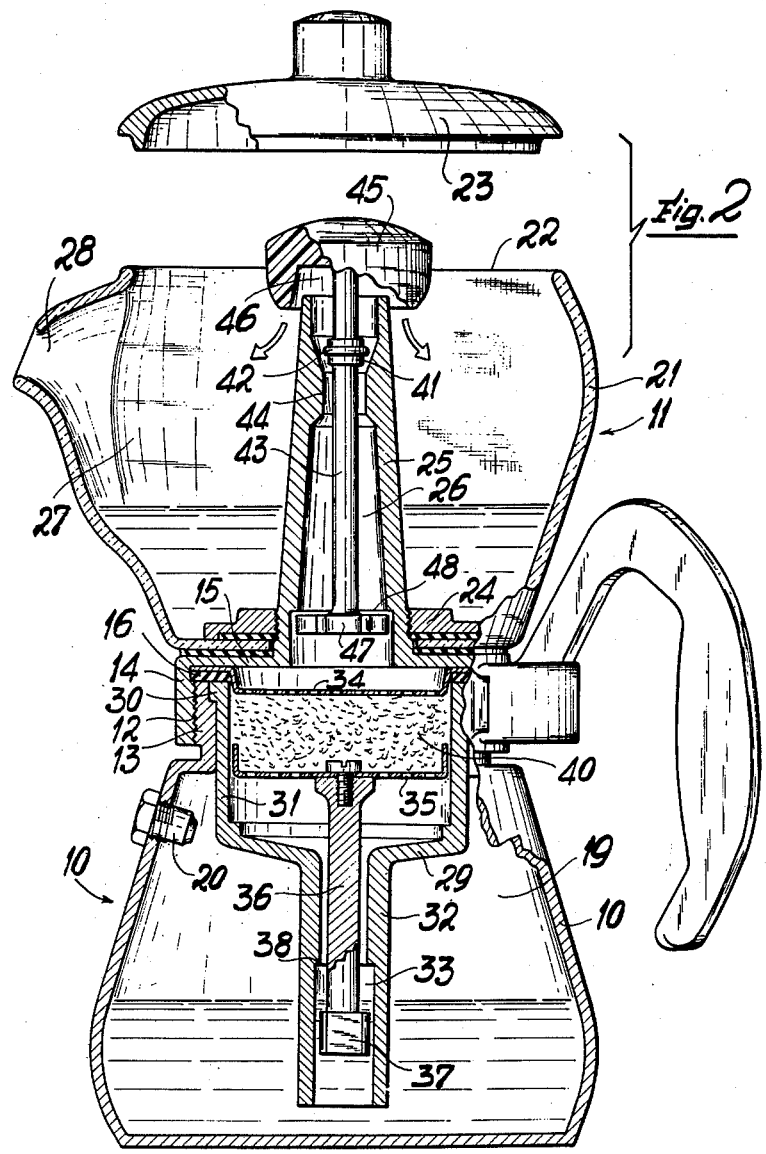

3,077,156
Patented Feb. 12, 1963

3,077,156
PERCOLATOR
Mario Egi, 1 Via Montefeltro, and Andrea Ivo Novi,
63 Corso Buenos Aires, both of Milan, Italy
Filed Nov. 12, 1958, Ser. No. 773,446
Claims priority, application Italy Nov. 12, 1957
6 Claims. (Cl. 99—285)

The present invention relates to coffee-maker devices and, more particularly, it is related to percolators of the type including, in general and according to a known construction, a lower chamber wherein a proper amount of water may be enclosed and heated up to boiling and to produce steam pressure, an upper chamber wherein the percolate, say the coffee beverage, may be collected upon passage of hot water through a layer or "filter" of ground coffee, an upwardly directed passage having an inlet in said lower chamber near the bottom thereof and an outlet in the said upper chamber, for causing the water to forcedly pass from said lower to said upper chamber under the said steam pressure, and a filter cup arranged in said passage and provided with a pair of horizontal, parallel and spaced arranged perforated disks or diaphragms, defining a space therebetween, wherein a proper amount of ground coffee may be put and enclosed to form the filter to be traversed by said hot water.

It is known to those skilled in the art to which this invention appertains that percolators of the type referred to above require careful handling for having a beverage of the most desired taste and flavour percolated. In fact, the amount of ground coffee must be proportional, within well defined limits, to the amount of water. The ground coffee must be properly poured and slightly pressed between the perforated diaphragms for having a proper—not too much and not too light—resistance to passage of water. The water must thoroughly wet and traverse the whole amount of coffee and the passage must develop upon a proper determined pressure. Care must be paid to the heating of the percolator too, say by means of an external source of heat, an electric heater or a gas burner or stove, for example, so as to have the ebullition develop properly.

It has been found that such requirements may seldom be met in common home use of percolators and that, in general, the passage of water through the layer of ground coffee develops incorrectly. When a proper pressure is not attained the resulting small flow of water finds its way through a portion of the layer only, and the remaining water is therefore allowed to follow said way, so that only a part of the coffee is extracted. Sometimes the coffee is too densely set in the space defined within the perforated disks and a too high resistance to passage of water develops, causing a beverage of disagreeable flavour to be percolated.

It is an object of this invention to provide a new and improved percolator of the above type, wherein the upwardly directed passage thereof includes valve means adapted to keeping the said passage closed until the proper steam pressure is established in the lower chamber—whereby the percolation may be started and developed upon attaining the most desirable pressure of water through the coffee filter.

Another object of this invention is to provide a new and advantageous percolator as mentioned above, including operator controlled valve means in said passage, the preliminary development of the desired steam pressure being signalled to the operator say by the activation of a safety-valve arranged through a wall of said lower chamber.

A further object of this invention is to provide, in a new and improved percolator as noted above, an operator controlled valve having a valve member slidably seated in a portion of the upwardly directed passage and movable in the direction of water passage upon overcoming certain frictional resistance, so that, in case the operator does not properly act on the valve, the increase of steam pressure may cause the valve means to open.

A still further object of this invention is to provide an improved percolator as above, wherein the said valve means in the said passage is located above the said filter, to allow the hot water to reach the ground coffee—whereby the latter may be thoroughly wetted—before the actual percolation cycle develops.

Still another object of this invention is to provide, in a new and improved percolator of the character referred to above, a coffee filter forming assembly having an upwardly movable lower perforated disk in a filter cup member—whereby upon the upward motion of hot water in said passage the resistance encountered by the liquid in traversing the lower disk causes the said disk to move upwardly to properly squeeze the ground coffee previously set thereabove—so that the percolator may be satisfactorily operated even if smaller amounts of coffee and of water are placed therein, say for producing, when desired, amounts of beverage smaller than the full capacity of the device.

Other objects and advantages of the invention are in part obvious and will in part be made apparent as this description proceeds, and the features which are considered as new and characteristic of this invention will be set forth in particular in the appended claims.

The invention itself, however, both as to its construction and to its mode of operation will be best understood from the following detailed description of a preferred embodiment of the invention, when read in conjunction with the accompanying drawings, forming an essential component of this disclosure, and wherein:

FIGURE 1 is a vertical sectional view of said preferred form of embodiment of the invention, the wall portions and certain parts being partially shown in side elevation, the components of the device being illustrated as set in their inoperative or "resting" relative position, and FIGURE 2 illustrates the same apparatus as set during the percolating step.

Referring now to the drawings, wherein like reference numerals refer to like parts and elements throughout the two figures:

In general, the percolator of the invention includes a lower assembly 10 and an upper assembly 11, detachably connected say by means of a screw-threaded connection at 12 provided say by an external screw thread on a neck portion 13 of said lower assembly 10 and an internal mating screw thread in the lower enlarged portion 14 of a member 15 fixedly connected to said upper assembly 11, a gasket 16 say of synthetic rubber or of heat-resisting resilient plastic being provided for actuating a pressure-tight connection between said two assemblies. A suitable handle means 17 of urea resin or other suitable heat insulating material may be provided, say fixedly connected to said enlarged portion 14.

Preferably, the said lower assembly 10 consists of a metallic pot member 18 defining a lower chamber 19 wherein the amount of water to be percolated is poured, up detachment of said assemblies, and pressure-tightly enclosed for heating up to ebullition. A safety-valve 20 is provided in the wall of said pot member 18, near to the upper portion thereof, to provide a fluid passage to outside when the stem pressure in chamber 19 reaches a predetermined values. Preferably the said safety valve is of known "whistle" type so that the said safety valve, besides its purposes of safely preventing overpressure in the boiling chamber 19, acts as a signalling device for indicating that the percolator has attained is most desirable condition for the percolating step, as explained below in detail.

The said upper assembly 11 includes an upper beverage collecting pot 21 having an upper opening at 22 closed by a suitable removable cover 23 adapted to be preferably removed prior to development of the percolating step. The said upper pot 21 is preferably made of transparent or of translucent material, say a heat-resisting glass. The said pot 21 includes an inwardly turned lower flange portion adapted for abutment on and to be fixedly secured to a flange formed by said enlarged portion of member 15, suitable gaskets being provided between said flange portions in abutting relationship. The said connection may be attained for example by means of an annular member 24 screw-threaded about the lower part of an upwardly directed tubular portion 25 of said member 15, the inner passage 26 of which forms the upper portion of the upwardly directed passage 26, 33 through which the lower chamber 19 may communicate with the interior 27 of beverage collecting pot 21.

Further, the said pot 21 is preferably provided with a suitably shaped pouring outlet at 28.

In the said lower assembly 10 an inner member 29 is removably arranged, supported say by means of a shoulder step at 30 in the said neck portion 13, the removal of said member 29 obviously being made possible upon detachment of said upper assembly 11. Said member 29 includes a cylindrical cup-shaped upper portion 31 forming the "filter" cup and a lower tubular portion 32, the inner passage 33 of which forms the lower portion of the said upwardly directed passage 26, 33.

The top of said cup 31 is covered by a perforated upper disk 34 which may be secured to said upper assembly 11 say by means of the gasket 16. A lower perforated disk 35 is axially slidably located in the said cup portion 31. Preferably, the said lower perforated disk or diaphragm 35 is secured to a stem 36 having an enlarged square cross-sectioned portion at 37, adapted to abut from below on a shoulder 38 in passage 33 of tubular portion 32, to prevent full detachment of said lower disk 35 from the said member 29. The said stem 36 and its lower portion 37 do not completely occupy the cross-sectional area of passage 33, so that a fluid communication always exists between the lower boiling chamber 19 and the interior of said cup member 31.

The space 39 (FIG. 1) designed to receive and contain the required amount 40 (FIG. 2) of ground coffee is therefore defined by the outer wall of said cup portion 31, the upper perforated disk 34 and the lower perforated disk 35. The volume of space 39 may be reduced upon raising in direction A (FIG. 1) the said lower disk 35 which is slidable in said cup portion 31.

Inasmuch as the very small perforations of the lower disk or diaphragm 35 offer a certain resistance to passage of water, just prior to the percolating step, when the water starts to pass upwardly through the passage 33 towards the space 39, an upwardly directed thrust is thereby applied in direction A on the perforated diaphragm 35. Diaphragm 35 is caused to move upwardly until the ground coffee 40 in the space 39 becomes properly packed, the compressing of the ground coffee being proportional to the steam pressure established in lower chamber 19 and pre-determined by the adjustment of safety valve 20.

From the above it will be readily understood that the percolator constructed according to the invention may be satisfactorily operated by previously pouring any desired amount (within the limits defined by the size of the apparatus) of ground coffee into the filter cup, the said amount being properly packed by the percolator itself during its cycle of operation. Therefore, the percolator may be operated say for producing greatly reduced amounts of beverage, than its maximum capacity. This feature of the invention avoids the known objection to which currently produced percolators of the type considered are subject, that percolators of predetermined size are capable of producing only the predetermined amounts of good quality beverage in each cycle of operation thereof. On the other hand, "family size" percolators (say provided for four or six cups of beverage) produced according to the invention may be made use of say for producing, if desired, one or two cups of properly flavored beverage only. In the actual production of percolators of the invention, indeed, it has been found desirable to oversize the said space 39 in respect to the other components of the apparatus, so that the operator is not compelled to press the ground coffee in the filter cup thereof, the said pressing being performed by the operation of the percolating apparatus.

In passage 26 of upper portion 25, an operator controlled valve means is provided for keeping the said passage closed until a proper pressure is established in the lower boiling chamber 19. In the preferred form of embodiment of the invention, shown in the accompanying drawings, the said valve means consists of an enlarged portion 41, preferably provided with an O-ring type gasket 42, of a stem member 43 freely movable from a lowermost to an uppermost position in the said passage 26, and pressure-tightly located when at its said lowermost position (FIG. 1) in a restricted portion 44 of said passage 26. The said restricted portion 44 of passage 26 is axially dimensioned so that as the said stem 43 is upwardly moved in direction B (FIG. 1) up to its uppermost position (FIG. 2) the said portion 41 is freed therefrom, thereby opening fluid communication between the said filter cup and upper beverage collecting chamber 27. It will be noted that while the valve means 41, 42 is in its closed position shown in FIG. 1, the pressure builds up beneath the valve means, whereas when the valve means 41, 42 is in its open position illustrated in FIG. 2, there is a sudden drop in the pressure. Thus, when the valve means is moved to its open position, the pressure differential between the pressure on top of the liquid in the lower container 10 and the pressure in the chamber 27, the latter being atmospheric pressure, is such that the liquid from the container 10 suddenly gushes upwardly through the tube 32 raising the perforated plate 35 so as to compress the coffee between plates 34 and 35, only after the valve 41, 42 is in its open position. Thus, before the valve is in its open position, there is substantially no movement of water upwardly through the tube 32 but rather the space along the interior of the tube 32, as well as the interior of the tube 25 is filled with steam and this vapor moves freely through the coffee which is not yet compressed so that the coffee is thoroughly contacted by the steam. Therefore, upon opening of the valve, the liquid flows upwardly to move the plate 35 upwardly so as to compress the coffee and thus provide the best possible extraction.

A handle forming knob 45 may be secured to the upper end portion of said stem 43, above the upper end portion of member 25. Preferably, the said knob 45 is provided with a down-facing cavity 46 shaped to cause the beverage, flowing outside the passage outlet forming the upper end of member 25, to be downwardly directed as indicated by arrows C in the beverage collecting pot 21.

The uppermost position of said stem 43 (FIG. 2) is defined, for example, by the abutment from below of an enlarged lower portion 47 on a shoulder step 48 provided in the lower end portion of said passage 26, while the lowermost position of said stem (FIG. 1) may be defined by direct abutment of the said knob 45 on the upper end portion of the member 25. It will be further recognized that the said valve means in passage 26 opens as the movable components thereof move upwardly, i.e. as they would move under the thrust exerted by the pressure established in lower boiling chamber 19. Since, as it is known to those skilled in the art, percolators of the type considered operate under pretty low pressures, the frictional resistance offered by gasket 42 in the restricted portion 44 of passage 26 is greater than the thrust due to the regular pressure of operation, and therefore the described valve means is not subject to being automatically opened prematurely. Such automatic opening, however, may occur without danger notwithstanding the fact that the operator does not pull upwardly on knob 45, because if the boiling becomes excessive the steam is completely discharged through safety valve 20.

For preparing the described percolator for operation, upon removal of upper assembly 11 and of cup member 29 from the lower assembly 10, the desired amount of water is put into lower chamber 19 and the desired amount of ground coffee is put into said filter cup, above the lower perforated diaphragm 35 thereof, no care being required for pressing said coffee in said cup. Upon resetting of said assemblies together, the apparatus is now ready to be placed above a suitable source of heat (not shown), say a gas or an electric burner or portable stove.

As the required steam pressure is established in boiling chamber 19, the outflow of steam from safety valve 20 signals that the percolator is ready for the percolating step. The operator then moves the knob 45 upwardly and the pressurized water abruptly starts to go up through passage 33, raising in the direction A the lower perforated disk 35 to press the ground coffee 40 in the filter cup, and the passage of water through the layer of coffee is produced, while the percolated beverage collects in the upper pot 21.

While the invention has been heretofore described and shown but in one preferred form of embodiment thereof, it is intended that the invention is not limited to the details shown, and that the said details should not be taken as restrictive of the invention, as it is obvious that various modifications in design may be resorted to by those skilled in the art to which this invention appertains, without departing from the spirit and the scope of the invention, as defined by and in the appended claims.

For example, the upper assembly including the beverage collecting pot might be omitted and the upper portion of the passage, say the tubular member 25, might be provided with one or more pouring necks shaped and positioned for direct pouring of the beverage into cups or other suitable containers not belonging to the percolator or associated therewith. Further, the percolator might be constructed integral with a proper source of heat, say an electric resistor connected to the lower boiling pot at the bottom thereof, or the like. The operator controlled valve means above described might be substituted by a self-acting valve means, a ballast loaded or a spring loaded valve for example, adjusted for self-operation as the required steam pressure is established in the boiling pot.

Such alternative structures and any combination thereof are considered well within the concept of the invention as claimed.

Without further analysis, the foregoing will so fully reveal the gist of this invention that others can, by applying current knowledge, readily adapt it for various applications in percolating devices, without omitting features that, from the standpoint of prior art, fairly constitute characteristics of the invention and, therefore, such adaptations should and are considered to be comprehended within the range of equivalents of the invention.

What we claim as new and desire to have protected by Letters Patent is:

1. In a coffee maker, in combination, a lower container adapted to contain water which is heated in said lower container; an inner container communicating with the interior of said lower container and having an open top; an upper perforated plate extending across the interior of said inner container; a lower perforated plate located in and extending across said inner container beneath said upper plate; means guiding said lower plate for movement in said inner container toward and away from said upper plate, said lower and upper plates defining between themselves a space adapted to receive coffee; an upper container located over said lower and inner containers and having an inner tubular portion communicating fluid-tightly through said inner container with said lower container; and valve means cooperating with said tubular portion of said upper container for closing said tubular portion when said valve means is in its closed position so as to build up pressure beneath said valve means when water in said lower container is heated and for opening said tubular portion and providing a sudden drop in pressure when said valve means is moved from said closed position thereof to an open position thereof, the sudden drop in pressure resulting from movement of said valve means to its open position releasing the heated water in the lower container for sudden upward movement through the inner container and through the tubular portion of said upper container and the upwardly moving water moving said lower plate upwardly to compress the coffee between the lower and upper plates while the water flows through the coffee.

2. In a coffee maker as recited in claim 1, safety valve means carried by said lower container for releasing steam therefrom when the pressure in the lower container reaches a given value upon heating of water therein, and said safety valve means whistling during escape of steam therethrough to signal that said pressure has been reached, and said first-mentioned valve means being manually movable to its open position so that the operator, upon hearing the signal of said safety valve means, will then open said first-mentioned valve means.

3. In a coffee maker as recited in claim 1, said valve means including an inner cylindrical surface of said tubular poriton of said upper container and a valve member in the form of a piston slidably engaging said cylindrical surface with a predetermined friction so that when the pressure resulting from heating of the liquid in the lower container is sufficient to overcome said friction, said valve means will automatically be moved to its open position.

4. In a coffee maker as recited in claim 1, said upper container having a top end at an elevation higher than the upper end of said tubular portion thereof so that the liquid flowing upwardly through said tubular portion will spill downwardly around the exterior thereof into said upper container.

5. In a coffee maker as recited in claim 1, said inner container being removably carried by said lower container in the interior of the latter and said upper container being removably connected to said lower container.

6. In a coffee maker as recited in claim 5, said inner container having a top end at the same elevation as the top end of said lower container, a sealing ring resting on the top ends of said inner and lower containers and said upper plate resting on said sealing ring, said upper container being threaded onto said lower container and compressing said sealing ring between said upper plate and the top faces of said inner and lower containers.

References Cited in the file of this patent

UNITED STATES PATENTS

| 1,171,022 | Ciletti | Feb. 8, 1916 |

FOREIGN PATENTS

| 10,264 | Great Britain | of 1913 |
| 436,322 | Germany | Oct. 29, 1926 |
| 443,477 | Italy | Dec. 21, 1948 |
| 490,085 | Italy | Jan. 30, 1954 |
| 494,993 | Italy | June 7, 1954 |